(12) United States Patent
Bhat et al.

(10) Patent No.: US 7,858,700 B2
(45) Date of Patent: Dec. 28, 2010

(54) THERMOPLASTIC COMPOSITIONS, METHOD OF MANUFACTURE, AND ARTICLES THEREFROM

(75) Inventors: Shrikant Bhat, Bangalore (IN); Sriram Krishnamurthy, Bangalore (IN); Roopali Rai, Bangalore (IN); Sandeep Tyagi, Maharashtra (IN); Andries Adriaan Volkers, Wouw (NL)

(73) Assignee: Sabic Innovative Plastics IP B.V. (NL)

( * ) Notice: Subject to any disclaimer, the term of this patent is extended or adjusted under 35 U.S.C. 154(b) by 485 days.

(21) Appl. No.: 11/930,640

(22) Filed: Oct. 31, 2007

(65) Prior Publication Data

US 2009/0111943 A1   Apr. 30, 2009

(51) Int. Cl.
*C08L 83/00* (2006.01)
*C08L 51/10* (2006.01)

(52) U.S. Cl. .................... 525/101; 525/63; 524/261; 524/423

(58) Field of Classification Search ............... 525/101, 525/63; 524/261, 423
See application file for complete search history.

(56) References Cited

U.S. PATENT DOCUMENTS

| 4,247,708 | A | 1/1981 | Tsutsumi et al. |
| 4,318,843 | A | 3/1982 | Kohler et al. |
| 4,810,305 | A | 3/1989 | Braun et al. |
| 5,391,600 | A | * 2/1995 | Umeda et al. ............... 524/267 |
| 5,637,643 | A | * 6/1997 | Umeda et al. ............... 524/537 |
| 6,200,580 | B1 | 3/2001 | Horino et al. |
| 2006/0199879 | A1 | * 9/2006 | Agarwal ..................... 523/201 |
| 2006/0287422 | A1 | 12/2006 | Volkers et al. |

FOREIGN PATENT DOCUMENTS

WO    2007037952 A1    4/2007
WO    2007143318 A1    12/2007

OTHER PUBLICATIONS

XP-002137886, JP 19970042576, Date Published: Feb. 26, 1997, abstract.
European Patent Office, PCT International Search Report, International Application No. PCT/IB2008/054403, Date of Mailing: Mar. 16, 2009.
European Patent Office, PCT Written Opinion of the ISA, International Application No. PCT/IB2008/054403, Date of Mailing: Mar. 16, 2009.
International Patentability Report on Patentability for PCT/IB2008/054403, mailed May 14, 2010, 7 pages.

* cited by examiner

*Primary Examiner*—Ling-Siu Choi
*Assistant Examiner*—Chun-Cheng Wang
(74) *Attorney, Agent, or Firm*—Cantor Colburn LLP

(57) ABSTRACT

A thermoplastic composition comprising, based on the total weight of the thermoplastic composition, from 0.1 to 30 weight percent of an inorganic filler composition comprising an inorganic filler-polyorganosiloxane composite; up to 80 weight percent of a polycarbonate; and from 1 to 25 weight percent of an impact modifier. Methods of preparing the compositions and articles comprising the compositions are described.

27 Claims, No Drawings

THERMOPLASTIC COMPOSITIONS, METHOD OF MANUFACTURE, AND ARTICLES THEREFROM

BACKGROUND

This disclosure relates to thermoplastic compositions, in particular thermoplastic compositions containing an inorganic filler, methods for the manufacture of such compositions, and articles formed from the compositions.

Polycarbonates are useful in the manufacture of articles and components for a wide range of applications, from automotive parts to electronic appliances. Because of their broad use, particularly in metal replacement applications, such as in automotive applications, there is a need for increased stiffness and reduced coefficient of thermal expansion, while at the same time maintaining excellent ductility and flow properties.

One known method of increasing stiffness in polycarbonates is by the addition of inorganic particulate fillers such as clay, talc, and mica. Such compositions, specifically talc- and/or mica-filled polycarbonates and polycarbonate blends, can degrade upon processing. As used herein, "degrade" and "degradation" of polycarbonates or polycarbonate blends are known to one skilled in the art and generally refer to a reduction in molecular weight and/or an adverse change in mechanical or physical properties.

The addition of inorganic particulate fillers can also adversely affect the ductility and/or flow of polycarbonates and polycarbonate blends. Use of talc can also give rise to poor stress transfer at the polymer-talc interface, leading to a reduction in tensile and flexural properties.

Various filler treatments intended to address the above drawbacks have been developed, including acid treatment (see, e.g., US Publication No. 2006/0287422) and silane treatment. However, neither acid nor silane treatment has been found to counter the adverse impact of talc on ductility or flow properties when added to polycarbonate blends with acrylonitrile-butadiene-styrene. To improve the ductility of polymer-filler compositions, there are reports of rubber particle encapsulation in the polymer matrix. This too comes at a cost of reduced tensile and flexural properties. Thus, there remains a need in the art for methods to reduce or eliminate filler-induced polymer degradation, while at the same time improving the ductility and flow properties of filled polycarbonate blends.

BRIEF DESCRIPTION

The above-described and other drawbacks are alleviated by a thermoplastic composition comprising, based on the total weight of the thermoplastic composition, from 0.1 to 30 weight percent of an inorganic filler composition comprising an inorganic filler-polyorganosiloxane composite; up to 80 weight percent of a polycarbonate; and from 1 to 25 weight percent of an impact modifier.

In a specific embodiment a thermoplastic composition comprises, based on the total weight of the thermoplastic composition, from 1 to 25 weight percent of an inorganic filler composition comprising a talc-polyorganosiloxane composite derived by the treatment of talc with a liquid polyorganosiloxane of the formula

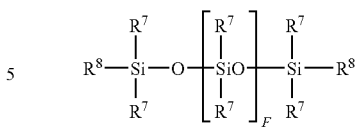

wherein F has an average value from 5 to 50, each $R^7$ is methyl, a mixture of methyl and trifluoropropyl, or a mixture of methyl and phenyl, and each $R^8$ is a hydroxy group; from 50 to 80 weight percent of a polycarbonate comprising units derived from bisphenol A; from 1 to 15 weight percent of a methacrylate-butadiene-styrene impact modifier; and from 1 to 15 weight percent of a styrene-acrylonitrile rigid copolymer.

In another embodiment, a thermoplastic composition comprises, based on the total weight of the thermoplastic composition, from 1 to 25 weight percent of an inorganic filler composition comprising a talc-polyorganosiloxane composite derived by the treatment of talc with a liquid polyorganosiloxane of the formula

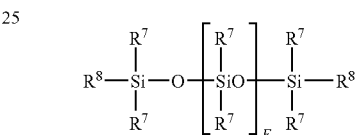

wherein F has an average value from 5 to 50, each $R^7$ is methyl, a mixture of methyl and trifluoropropyl, or a mixture of methyl and phenyl, and each $R^8$ is independently a $C_{1-13}$ monovalent organic group, a $C_{1-13}$ divalent organic group comprising a group reactive with the inorganic filler, or a group reactive with the inorganic filler; from 50 to 80 weight percent of a polycarbonate comprising units derived from bisphenol A; from 1 to 15 weight percent of a methacrylate-butadiene-styrene impact modifier; and from 1 to 15 weight percent of a styrene-acrylonitrile rigid copolymer.

A method of manufacture of a thermoplastic composition comprises melt mixing the above-described components to form the thermoplastic composition.

In still another embodiment, an article is provided comprising the above-described compositions.

A method of manufacture of an article comprises molding or extruding the above-described compositions.

Another embodiment is a method of preparing an inorganic filler-polyorganosiloxane composite, the method comprising dispersing an inorganic filler in a solvent to form a dispersion; adding a polyorganosiloxane to the dispersion to form a mixture; adding a base to the mixture to form a dispersed filler-polysiloxane composite; and separating the dispersed filler-polysiloxane composite from the solvent.

Finally, an inorganic filler-polyorganosiloxane composite comprises the reaction product of an inorganic filler; and a reactive polyorganosiloxane of the formula

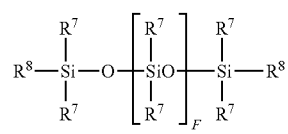

wherein F has an average value of 5 to 50; each $R^7$ is independently a $C_{1-13}$ monovalent organic group or a $C_{1-13}$ divalent organic group comprising a group reactive with the inorganic filler, and each $R^8$ is independently a $C_{1-13}$ monovalent organic group, a $C_{1-13}$ divalent organic group comprising a group reactive with the inorganic filler, or a group reactive with the inorganic filler, provided that at least one $R^7$ is a $C_{1-13}$ divalent organic group comprising a group reactive with the inorganic filler or at least one $R^8$ is a group reactive with the inorganic filler or a $C_{1-13}$ divalent organic group comprising a group reactive with the inorganic filler.

These and other features, aspects, and advantages of the present invention will become better understood with reference to the following description and appended claims.

DETAILED DESCRIPTION

It has been found by the inventors hereof that the treatment of particulate inorganic fillers such as talc with polyorganosiloxanes provides a composite filler with improved properties. It has further been found that use of the composite filler in thermoplastic compositions, particularly those comprising polycarbonate and an impact modifier, improves the stability of the polymer composition and the balance of modulus, ductility, and flow properties. In a particularly advantageous embodiment, the compositions further comprise a stabilizing amount of an acid. The acid can be used to treat the filler (before or after polyorganosiloxane treatment) or added to the compositions separately.

In one embodiment the thermoplastic polymer component of the thermoplastic composition comprises a polycarbonate and an impact modifier. As used herein, the term "polycarbonate" means compositions having repeating structural carbonate units of formula (1):

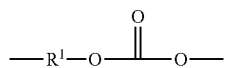

(1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (2):

HO-$A^1$-$Y^1$-$A^2$-OH          (2)

wherein each of $A^1$ and $A^2$ is a monocyclic divalent aromatic group and $Y^1$ is a single bond or a bridging group having one or more atoms that separate $A^1$ from $A^2$. In an exemplary embodiment, one atom separates $A^1$ from $A^2$. Specifically, each $R^1$ can be derived from a dihydroxy aromatic compound of formula (3)

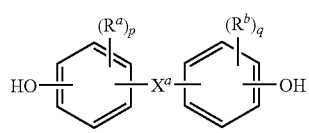

(3)

wherein $R^a$ and $R^b$ are each independently a halogen or $C_{1-12}$ alkyl group and can be the same or different; and p and q are each independently integers of 0 to 4. It will be understood that $R^a$ is hydrogen when p is 0, and likewise $R^b$ is hydrogen when q is 0. Also in formula (3), $X^a$ represents a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In one embodiment, p and q are each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{7-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (4)

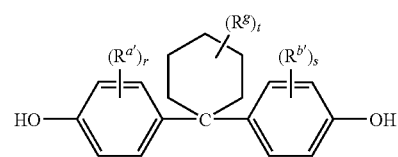

(4)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. In a specific embodiment, at least one of each of $R^{a'}$ and $R^{b'}$ are disposed meta to the cyclohexylidene bridging group. The substituents $R^{a'}$, $R^{b'}$, and $R^g$ may, when comprising an appropriate number of carbon atoms, be straight chain, cyclic, bicyclic, branched, saturated, or unsaturated. In an embodiment, $R^{a'}$ and $R^{b'}$ are each independently $C_{1-4}$ alkyl, $R^g$ is $C_{1-4}$ alkyl, r and s are each 1, and t is 0 to 5. In another specific embodiment, $R^{a'}$, $R^{b'}$ and $R^g$ are each methyl, r and s are each 1, and t is 0 or 3. The cyclohexylidene-bridged bisphenol can be the reaction product of two moles of o-cresol with one mole of cyclohexanone. In another exemplary embodiment, the cyclohexylidene-bridged bisphenol is the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol-containing polycarbonates, or a combination comprising at least one of the foregoing with other bisphenol polycarbonates, are supplied by Bayer Co. under the APEC® trade name.

In another embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group.

$X^a$ can also be a substituted $C_{3-18}$ cycloalkylidene of formula (5):

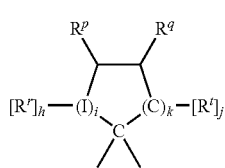

(5)

wherein $R^r$, $R^p$, $R^q$, and $R^t$ are each independently hydrogen, halogen, oxygen, or $C_{1-12}$ organic groups; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is 1 and i is 0, the ring as shown in formula (5) contains 4 carbon atoms, when k is 2, the ring as shown in formula (5) contains 5 carbon atoms, and when k is 3, the ring contains 6 carbon atoms. In one embodiment, two adjacent groups (e.g., $R^q$ and $R^t$ taken together) form an aromatic group, and in another embodiment, $R^p$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful aromatic dihydroxy compounds of the formula HO—$R^1$—OH include compounds of formula (6):

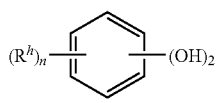

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis (hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds of formula (3) include 1,1-bis(4-hydroxyphenyl) methane, 1,1-bis(4-hydroxyphenyl) ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-1-methylphenyl) propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (3).

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000, specifically 20,000 to 100,000 as measured by gel permeation chromatography (GPC), using a crosslinked styrene-divinylbenzene column and calibrated to polycarbonate references. GPC samples are prepared at a concentration of 1 mg/ml, and are eluted at a flow rate of 1.5 ml/min.

In one embodiment, the polycarbonate has flow properties useful for the manufacture of thin articles. Melt volume flow rate (often abbreviated MVR) measures the rate of extrusion of a thermoplastic through an orifice at a prescribed temperature and load. Polycarbonates useful for the formation of thin articles can have an MVR, measured at 260° C./5 kg, of 1 to 30 cubic centimeters per 10 minutes (cc/10 min), specifically 2 to 20 cc/10 min. Combinations of polycarbonates of different flow properties can be used to achieve the overall desired flow property.

"Polycarbonates" as used herein further includes homopolycarbonates (wherein each $R^1$ in the polymer is the same), copolymers comprising different $R^1$ moieties in the carbonate (referred to herein as "copolycarbonates"), copolymers comprising carbonate units and other types of polymer units, such as ester units, and combinations comprising at least one of a homopolycarbonate and/or a copolycarbonate. As used herein, a "combination" is inclusive of blends, mixtures, alloys, reaction products, and the like.

A specific type of copolymer is a polyester carbonate, also known as a polyester-polycarbonate. Such copolymers further contain, in addition to recurring carbonate chain units of formula (1), repeating units of formula (7):

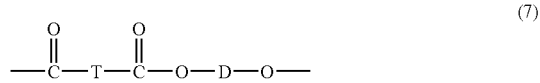
(7)

wherein D is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically 2, 3, or 4 carbon atoms; and T divalent group derived from a dicarboxylic acid, and can be, for example, a $C_{2-10}$ alkylene group, a $C_{6-20}$ alicyclic group, a $C_{6-20}$ alkyl aromatic group, or a $C_{6-20}$ aromatic group. Copolyesters containing a combination of different T and/or D groups can be used. The polyesters can be branched or linear.

In one embodiment, D is a $C_{2-30}$ alkylene group having a straight chain, branched chain, or cyclic (including polycyclic) structure. In another embodiment, D is derived from an aromatic dihydroxy compound of formula (4) above. In another embodiment, D is derived from an aromatic dihydroxy compound of formula (7) above.

Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 91:9 to 2:98. In another specific embodiment, D is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

In a specific embodiment, the polyester unit of a polyester-polycarbonate can be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol A. In a specific embodiment, the polycarbonate units are derived from bisphenol A. In another specific embodiment, the polycarbonate units are derived from resorcinol and bisphenol A in a molar ratio of resorcinol carbonate units to bisphenol A carbonate units of 1:99 to 99:1.

Polycarbonates can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like.

Exemplary carbonate precursors include, for example, a carbonyl halide such as carbonyl bromide or carbonyl chloride, or a haloformate such as a bishaloformates of a dihydric phenol (e.g., the bischloroformate of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is independently the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst can be 0.1 to 10 weight percent based on the weight of bisphenol in the phosgenation mixture. In another embodiment an effective amount of phase transfer catalyst can be 0.5 to 2 weight percent based on the weight of bisphenol in the phosgenation mixture. All types of polycarbonate end groups are contemplated as being useful in the thermoplastic composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 weight percent. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_{1-22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_{1-22}$ allyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl) carboxylate, bis(4-acetylphenyl)carboxylate, or a combination comprising at least one of the foregoing. In addition, useful transesterification catalyst for use can include phase transfer catalysts of formula $(R^3)_4Q^+X$ above, wherein each $R^3$, Q, and X are as defined above. Exemplary transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

In addition to the polycarbonates described above, combinations of the polycarbonate with other thermoplastic polymers, for example combinations of homopolycarbonates and/or polycarbonate copolymers with polyesters, can be used. Useful polyesters can include, for example, polyesters having repeating units of formula (7), which include poly(alkylene dicarboxylates), liquid crystalline polyesters, and polyester copolymers. The polyesters described herein are generally completely miscible with the polycarbonates when blended. Also contemplated are aromatic polyesters with a minor amount, e.g., 0.5 to 10 weight percent, based on the total weight of the polyester, of units derived from an aliphatic diacid, and poly(alkylene terephthalates) such as poly(ethylene terephthalate) (PET), poly(1,4-butylene terephthalate) (PBT), and poly(propylene terephthalate) (PPT). Also useful are poly(alkylene naphthanoates), such as poly(ethylene naphthanoate) (PEN), and poly(butylene naphthanoate) (PBN). A specifically useful poly(cycloalkylene diester) is poly(cyclohexanedimethylene terephthalate) (PCT) and poly (1,4-cyclohexane-dimethanol-1,4-cyclohexanedicarboxylate) (PCCD). Copolymers comprising alkylene terephthalate repeating ester units with other ester groups can also be useful, for example poly(cyclohexanedimethylene terephthalate)-co-poly(ethylene terephthalate), abbreviated as PETG where the polymer comprises greater than or equal to 50 mole percent of poly(ethylene terephthalate), and abbreviated as PCTG where the polymer comprises greater than 50 mole percent of poly(1,4-cyclohexanedimethylene terephthalate). Combinations comprising at least one of the foregoing polyesters can also be used.

The polycarbonate and polyester can be used in a weight ratio of 1:99 to 99:1, specifically 10:90 to 90:10, and more specifically 30:70 to 70:30, depending on the function and properties desired.

The polymer component of the thermoplastic composition further optionally comprises a polyorganosiloxane-polycarbonate copolymer, also referred to as a polysiloxane-polycarbonate. The polyorganosiloxane blocks of the copolymer comprise repeating diorganosiloxane units of formula (8):

(8)

wherein each R is independently the same or different $C_{1-13}$ monovalent organic group. For example, R can be a $C_{1-13}$ alkyl, $C_{1-13}$ alkoxy, $C_{2-13}$ alkenyl group, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkyl, $C_{7-13}$ aralkoxy, $C_{7-13}$ alkylaryl, or $C_{7-13}$ alkylaryloxy. The foregoing groups can be fully or partially halogenated with fluorine, chlorine, bromine, or iodine, or a combination thereof. In an embodiment, where a transparent polyorganosiloxane-polycarbonate is desired, R is unsubstituted by halogen. Combinations of the foregoing R groups can be used in the same copolymer.

The value of E in formula (8) can vary widely depending on the type and relative amount of each component in the thermoplastic composition, the desired properties of the composition, and like considerations. Generally, E has an average value of 10 to 5,000, specifically 15 to 1,000, more specifically 20 to 500. In one embodiment, E has an average value of 10 to 75, and in still another embodiment, E has an average value of 40 to 60. Where E is of a lower value, e.g., less than 40, it can be desirable to use a relatively larger amount of the polyorganosiloxane-polycarbonate copolymer. Conversely, where E is of a higher value, e.g., greater than 40, a relatively lower amount of the polyorganosiloxane-polycarbonate copolymer can be used.

A combination of a first and a second (or more) polyorganosiloxane-polycarbonate copolymer can be used, wherein the average value of E of the first copolymer is less than the average value of E of the second copolymer.

In one embodiment, the polyorganosiloxane blocks are provided by repeating structural units of formula (9):

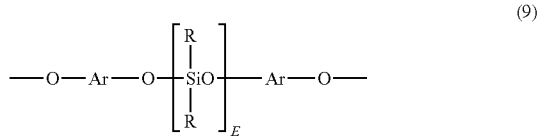

wherein E is as defined above; each R is independently the same or different, and is as defined above; and Ar can be the same or different, and is a substituted or unsubstituted $C_{6-30}$ arylene group, wherein the bonds are directly connected to an aromatic moiety. The Ar groups in formula (9) can be derived from a $C_{6-30}$ dihydroxyarylene compound, for example a dihydroxyarylene compound of formula (3) or (6) above. Exemplary dihydroxyarylene compounds are 1,1-bis(4-hydroxyphenyl) methane, 1,1-bis(4-hydroxyphenyl)ethane, 2,2-bis(4-hydroxyphenyl) propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds can also be used.

In another embodiment, polyorganosiloxane blocks comprise units of formula (10):

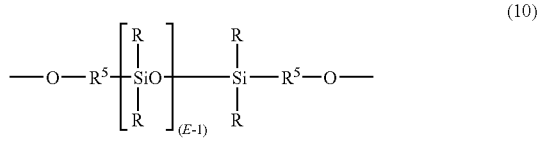

wherein R and E are as described above, and each $R^5$ is independently a divalent $C_{1-30}$ organic group, and wherein the polymerized polyorganosiloxane unit is the reaction residue of its corresponding dihydroxy compound. In a specific embodiment, the polyorganosiloxane blocks are provided by repeating structural units of formula (11):

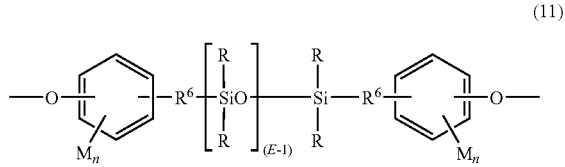

wherein R and E are as defined above. $R^6$ in formula (11) is a divalent $C_{2-8}$ aliphatic group. Each M in formula (11) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkylaryl, or $C_{7-12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^6$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^6$ is a divalent $C_{1-3}$ aliphatic group, and R is methyl.

Units of formulas (9), (10), and (11) can be derived from the corresponding dihydroxy polyorganosiloxanes as is known in the art.

The polyorganosiloxane-polycarbonate can comprise 50 to 99 weight percent of carbonate units and 1 to 50 weight percent siloxane units. Within this range, the polyorganosiloxane-polycarbonate copolymer can comprise 70 to 98 weight percent, more Specifically 75 to 97 weight percent of carbonate units and 2 to 30 weight percent, more specifically 3 to 25 weight percent siloxane units.

Polyorganosiloxane-polycarbonates can have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polycarbonate standards.

The polyorganosiloxane-polycarbonate can have a melt volume flow rate, measured at 300° C./1.2 kg, of 1 to 50 cubic centimeters per 10 minutes (cc/10 min), specifically 2 to 30 cc/10 min. Mixtures of polyorganosiloxane-polycarbonates of different flow properties can be used to achieve the overall desired flow property.

The thermoplastic composition further includes one or more impact modifiers to increase the impact resistance of the thermoplastic composition. These impact modifiers can include an elastomer-modified graft copolymer comprising (i) an elastomeric (i.e., rubbery) polymer substrate having a Tg less than 10° C., more specifically less than −10° C., or more specifically −40° C. to −80° C., and (ii) a rigid polymeric supersaturate grafted to the elastomeric polymer substrate. As is known, elastomer-modified graft copolymers can be prepared by first providing the elastomeric polymer, then polymerizing the constituent monomer(s) of the rigid phase in the presence of the elastomer to obtain the graft copolymer. The grafts can be attached as graft branches or as shells to an elastomer core. The shell can merely physically encapsulate the core, or the shell can be partially or essentially completely grafted to the core.

Materials for use as the elastomer phase include, for example, conjugated diene rubbers; copolymers of a conjugated diene with less than 50 weight percent of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Conjugated diene monomers for preparing the elastomer phase are of formula (16):

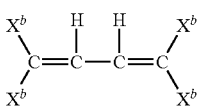

(16)

wherein each $X^b$ is independently hydrogen, $C_{1-5}$ alkyl, or the like. Examples of conjugated diene monomers that can be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as combinations comprising at least one of the foregoing conjugated diene monomers. Specific conjugated diene homopolymers include polybutadiene and polyisoprene.

Copolymers of a conjugated diene rubber can also be used, for example those produced by aqueous group emulsion polymerization of a conjugated diene and at least one monomer copolymerizable therewith. Monomers that are useful for copolymerization with the conjugated diene include monovinylaromatic monomers containing condensed aromatic ring structures, such as vinyl naphthalene, vinyl anthracene, and the like, or monomers of formula (17):

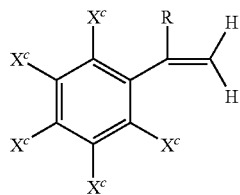

(17)

wherein each $X^c$ is independently hydrogen, $C_{1-12}$ alkyl, $C_{3-12}$ cycloalkyl, $C_{6-12}$ aryl, $C_{7-12}$ aralkyl, $C_{7-12}$ alkylaryl, $C_{1-12}$ alkoxy, $C_{3-12}$ cycloalkoxy, $C_{6-12}$ aryloxy, chloro bromo, or hydroxy, and R is hydrogen, $C_{1-5}$ alkyl, bromo, or chloro. Exemplary monovinylaromatic monomers that can be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing compounds. Styrene and/or alpha-methylstyrene can be used as monomers copolymerizable with the conjugated diene monomer.

Other monomers that can be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (18):

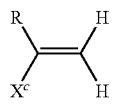

(18)

wherein R is hydrogen, $C_{1-5}$ alkyl, bromo, or chloro, and $X^c$ is cyano, $C_{1-12}$ alkoxycarbonyl, $C_{1-12}$ aryloxycarbonyl, hydroxy carbonyl, or the like. Examples of monomers of formula (18) include acrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Combinations of the foregoing monovinyl monomers and monovinylaromatic monomers can also be used.

(Meth)acrylate monomers for use in the elastomeric phase can be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers can optionally be polymerized in admixture with less than or equal to 15 weight percent of comonomers of formulas (16), (17), or (18), based on the total monomer weight. Exemplary comonomers include but are not limited to butadiene, isoprene, styrene, methyl methacrylate, phenyl methacrylate, phenethyl methacrylate, N-cyclohexylacrylamide, vinyl methyl ether or acrylonitrile, and combinations comprising at least one of the foregoing comonomers. Optionally, less than or equal to 5 weight percent of a polyfunctional crosslinking comonomer can be present, based on the total monomer weight. Such polyfunctional crosslinking comonomers can include, for example, divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth) acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase can be polymerized by mass, emulsion, suspension, solution or combined processes such as bulk-suspension, emulsion-bulk, bulk-solution or other techniques, using continuous, semi-batch, or batch processes. The particle size of the elastomer substrate is not critical. For example, an average particle size of 0.001 to 25 micrometers, specifically 0.01 to 15 micrometers, or even more specifically 0.1 to 8 micrometers can be used for emulsion based polymerized rubber lattices. A particle size of 0.5 to 10 micrometers, specifically 0.6 to 1.5 micrometers can be used for bulk polymerized rubber substrates. Particle size can be measured by simple light transmission methods or capillary hydrodynamic chromatography (CHDF). The elastomer phase can be a particulate, moderately cross-linked conjugated butadiene or $C_{4-6}$ alkyl acrylate rubber, and specifically has a gel content greater than 70%. Also useful are combinations of butadiene with styrene and/or $C_{4-6}$ alkyl acrylate rubbers.

The elastomeric phase comprises 5 to 95 weight percent of the total graft copolymer, more specifically 20 to 90 weight percent, and even more specifically 40 to 85 weight percent of the elastomer-modified graft copolymer, the remainder being the rigid graft phase. Suitable elastomer-modified graft copolymers include, for example, poly(acrylonitrile-butadiene-styrene) (ABS), poly(acrylonitrile-styrene-butyl acrylate) (ASA), poly(methyl methacrylate-butadiene-styrene) (MBS), poly(methyl methacrylate-acrylonitrile-butadiene-styrene) (MABS), poly(acrylonitrile-ethylene-propylene-diene-styrene) (AES), and the like and combinations thereof.

The rigid phase of the elastomer-modified graft copolymer can be formed by graft polymerization of a combination comprising a monovinylaromatic monomer and optionally at least one comonomer in the presence of at least one elastomeric polymer substrates. The above-described monovinylaromatic monomers of formula (17) can be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Useful comonomers include, for example, the above-described monovinylic monomers and/or monomers of the general formula (18). In one embodiment, R is hydrogen or $C_{1-2}$ alkyl, and $X^c$ is cyano or $C_{1-12}$ alkoxycarbonyl. Exemplary comonomers for use in the rigid phase include acrylonitrile, methacrylonitrile, methyl (meth)acrylate, ethyl (meth)acrylate, n-propyl (meth)acrylate, isopropyl (meth)acrylate, and the like, and combinations comprising at least one of the foregoing comonomers. Suitable rigid thermoplastic polymers include, for example, poly(styrene-acrylonitrile) (SAN), poly(styrene-alpha-methyl styrene-acrylonitrile), poly(methyl methacrylate-acrylonitrile-styrene), poly(methyl methacrylate-styrene), and mixtures thereof.

The relative ratio of monovinylaromatic monomer and comonomer in the rigid graft phase can vary widely depending on the type of elastomer substrate, type of monovinylaromatic monomer(s), type of comonomer(s), and the desired properties of the impact modifier. The rigid phase can generally comprise up to 100 weight percent of monovinyl aromatic monomer, specifically 30 to 100 weight percent, more specifically 50 to 90 weight percent monovinylaromatic monomer, with the balance being comonomer(s).

Depending on the amount of elastomer-modified polymer present, a separate matrix or continuous phase of ungrafted rigid polymer or copolymer can be simultaneously obtained along with the elastomer-modified graft copolymer. Such impact modifiers can comprise 40 weight percent to 95 weight percent elastomer-modified graft copolymer and 5 weight percent to 60 weight percent graft (co)polymer, based on the total weight of the impact modifier. In another embodiment, such impact modifiers comprise 50 weight percent to 85 weight percent, more specifically 75 weight percent to 85 weight percent rubber-modified graft copolymer, together with 15 weight percent to 50 weight percent, more specifically 15 weight percent to 25 weight percent graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^g)C(O)OCH_2CH_2R^h$, wherein $R^g$ is hydrogen or a $C_{1-8}$ linear or branched hydrocarbyl group and $R^h$ is a branched $C_{3-16}$ hydrocarbyl group; a first graft link monomer; a polymerizable alkenyl-containing organic material; and a second graft link monomer. The silicone rubber monomer can comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material can be, for example, a monomer of formula (17) or (18), e.g., styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, or the like, alone or in combination.

The first graft link monomer can be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from 30° C. to 110° C. to form a silicone rubber latex, in the presence of a surfactant such as dodecylbenzenesulfonic acid. Alternatively, a cyclic siloxane such as cyclooctamethyltetrasiloxane and a tetraethoxyorthosilicate can be reacted with a first graft link monomer such as (gamma-methacryloxypropyl)methyldimethoxysilane, to afford silicone rubber having an average particle size from 100 nanometers to 2 micrometers. At least one branched acrylate rubber monomer is then polymerized with the silicone rubber particles, optionally in the presence of a cross linking monomer, such as allylmethacrylate in the presence of a free group generating polymerization catalyst such as benzoyl peroxide. This latex is then reacted with a polymerizable alkenyl-containing organic material and a second graft link monomer. The latex particles of the graft silicone-acrylate rubber hybrid can be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from 100 nanometers to two micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

If desired, the foregoing types of impact modifiers can be prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and can catalyze transesterification and/or degradation of polycarbonates. Instead, ionic sulfate, sulfonate, or phosphate surfactants can be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. This emulsion polymerization process is described and disclosed in various patents and literature of such companies as Rohm & Haas and General Electric Company. In the practice, any of the above-described impact modifiers can be used providing it is free of the alkali metal salts of fatty acids, alkali metal carbonates, and other basic materials.

A specific impact modifier of this type is a methyl methacrylate-butadiene-styrene (MBS) impact modifier wherein the butadiene substrate is prepared using above-described sulfonates, sulfates, or phosphates as surfactants. Other examples of elastomer-modified graft copolymers besides ABS and MBS include but are not limited to acrylonitrile-styrene-butyl acrylate (ASA), methyl methacrylate-acrylonitrile-butadiene-styrene (MABS), and acrylonitrile-ethylene-propylene-diene-styrene (AES).

In some embodiments, the impact modifier is a graft polymer having a high rubber content, i.e., greater than or equal to 50 weight percent, optionally greater than or equal to 60 weight percent by weight of the graft polymer. The rubber can be present in an amount less than or equal to 95 weight percent, optionally less than or equal to 90 weight percent of the graft polymer. Exemplary high-rubber acrylonitrile-butadiene-styrene resins are available from SABIC Innovative Plastics (formerly General Electric Company) as BLENDEX® grades 131, 336, 338, 360, and 415.

The impact modifier can include an aromatic vinyl copolymer impact modifier, for example, a styrenic copolymer (also referred to as a "polystyrene copolymer"). The terms "aromatic vinyl copolymer" and "polystyrene copolymer" and "styrenic copolymer", as used herein, include polymers prepared by methods known in the art including bulk, suspension, and emulsion polymerization employing at least one monovinyl aromatic hydrocarbon. The polystyrene copolymers can be random, block, or graft copolymers. The aromatic vinyl copolymers comprise units derived from vinylaromatic compounds of formula (17), e.g., styrene, 4-methylstyrene, 3,5-diethylstyrene, 4-n-propylstyrene, α-methylstyrene, α-methylvinyltoluene, α-chlorostyrene, α-bromostyrene, dichlorostyrene, dibromostyrene, tetrachlorostyrene, and the like, and combinations thereof, in particular styrene and α-methylstyrene.

The aromatic vinyl copolymer further contains units derived from a comonomer of formula (18), e.g., acrylic monomers, maleic anhydride and derivates, and the like, and combinations thereof. Specific exemplary comonomers include ethylene, propylene, butenes (including 1-butene, 2-butene, and isobutene), pentenes, hexenes, and the like; 1,3-butadiene, 2-methyl-1,3-butadiene (isoprene), 1,4-pentadiene, 1,5-hexadiene, and the like; and combinations thereof.

Acrylic monomers include, for example, acrylonitrile, ethacrylonitrile, methacrylonitrile, α-chloroarylonitrile, β-chloroacrylonitrile, α-bromoacrylonitrile, and β-bromoacrylonitrile, methyl acrylate, methyl methacrylate, ethyl acrylate, butyl acrylate, propylacrylate, isopropyl acrylate, and the like, and mixtures thereof.

Maleic anhydride and derivatives thereof include, for example, maleic anhydride, maleimide, N-alkyl maleimide, N-aryl maleimide or the alkyl- or halo-substituted N-arylmaleimides, and the like, and combinations thereof.

The amount of comonomer(s) present in the aromatic vinyl copolymer can vary. However, the level is generally present at a mole percentage of 2 to 75 percent. Within this range, the mole percentage of comonomer can specifically be at least 4 percent, more specifically at least 6 percent. Also within this range, the mole percentage of comonomer can specifically be up to 50 percent, more specifically up to 25 percent, even more specifically up to 15 percent. Specific polystyrene copolymer resins include poly(styrene maleic anhydride) (SMA) and poly(styrene acrylonitrile) (SAN).

In one embodiment, the aromatic vinyl copolymer comprises (a) an aromatic vinyl monomer component and (b) a cyanide vinyl monomer component. Examples of (a) the aromatic vinyl monomer component include alpha-methylstyrene, o-, m-, or p-methylstyrene, vinyl xylene, monochlorostyrene, dichlorostyrene, monobromostyrene, dibromostyrene, fluorostyrene, p-tert-butylstyrene, ethylstyrene, and vinyl naphthalene, and these substances can be used individually or in combinations. Examples of (b) the cyanide vinyl monomer component include acrylonitrile and methacrylonitrile, and these can be used individually or in combinations of two or more. There are no particular restrictions on the composition ratio of (a) to (b) in the aromatic vinyl copolymer thereof, and this ratio should be selected according to the application in question. Optionally, the aromatic vinyl copolymer can contain 95 weight percent to 50 weight percent (a), optionally 92 weight percent to 65 weight percent (a) by weight of (a)+(b) in the aromatic vinyl copolymer and, correspondingly, 5 weight percent to 50 weight percent (b), optionally 8 weight percent to 35 weight percent (b) by weight of (a)+(b) in the aromatic vinyl copolymer.

The weight average molecular weight (Mw) of the aromatic vinyl copolymer can be 30,000 to 200,000, optionally 30,000 to 110,000, measured by gel permeation chromatography.

Methods for manufacturing the aromatic vinyl copolymer include bulk polymerization, solution polymerization, suspension polymerization, bulk suspension polymerization and emulsion polymerization. Moreover, the individually copolymerized resins can also be blended. The alkali metal content of the aromatic vinyl copolymer can be 1 ppm or less, optionally 0.5 ppm or less, for example, 0.1 ppm or less, by weight of the aromatic vinyl copolymer. Moreover, among alkali metals, the content of sodium and potassium in component (b) can be 1 ppm or less, and optionally 0.5 ppm or less, for example, 0.1 ppm or less.

In one embodiment, the aromatic vinyl copolymer comprises "free" styrene-acrylonitrile copolymer (SAN), i.e., styrene-acrylonitrile copolymer that is not grafted onto another polymeric chain. In a particular embodiment, the free styrene-acrylonitrile copolymer can have a molecular weight of 50,000 to 200,000 on a polystyrene standard molecular weight scale and can comprise various proportions of styrene to acrylonitrile. For example, free SAN can comprise 75 weight percent styrene and 25 weight percent acrylonitrile based on the total weight of the free SAN copolymer. Free SAN can optionally be present by virtue of the addition of a grafted rubber impact modifier in the composition that contains free SAN, and/or free SAN can by present independent of other impact modifiers in the composition.

In one embodiment, the impact modifier is an MBS available from Rohm & Haas under the trade name MBS EXL2691A (powder) having 75 to 82 wt. % butadiene core with a balance styrene-methyl methacrylate shell, but others, such as Rohm & Haas EXL3691A (pelletized) could also be used. The MBS can be manufactured in accordance with the process described U.S. Pat. No. 6,545,089, and is substantially free of impurities, residual acids, residual bases or residual metals that may catalyze the hydrolysis of polycarbonate. Control of the manufacture of the MBS to provide a slurry of the MBS having a pH of about 6 to about 7 provides optimal hydrolytic stability. The pH of a slurry of each of the components is measured using 1 g of the component and 10 mL of distilled water having a pH of 7 and containing a drop of isopropyl alcohol as a wetting agent.

In another embodiment, SAN is present in the composition, in addition to an impact modifier such as MBS. The SAN used is a bulk process material having a nominal acrylonitrile content of 25 wt.%, although SAN or other rigid polymers (vinyl aromatic polymers) having different amounts of acrylonitrile and made by either the bulk or suspension process could also be used. The composition can comprise 2 weight percent to 25 weight percent free SAN, optionally 2 weight percent to 20 weight percent free SAN, for example, 5 weight percent to 15 weight percent free SAN or, optionally, 7.5 weight percent to 10 weight percent free SAN, by weight of the composition as shown in the examples herein.

In another embodiment, the thermoplastic composition comprises, based on the total weight of the thermoplastic composition, from 0.1 to 30 weight percent of an inorganic filler composition comprising an inorganic filler-polyorganosiloxane composite; and up to 99.9 weight percent of a thermoplastic polymer composition. The polymer component of the thermoplastic compositions can include a wide variety of thermoplastic polymers other than the polycarbonate and impact modifier combination described above. Exemplary thermoplastic polymers include polyacetals, polyolefins, polyacrylics, polycarbonates (with no impact modifier present), polystyrenes, polyesters (e.g., polyethylene terephthalate and polybutylene terephthalate), polyamides, polyamideimides, polyarylates, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyphthalides, polyanhydrides, polyvinyl chlorides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polytetrafluoroethylene, fluorinated ethylene propylene, perfluoroalkoxyethylene, polychlorotrifluoroethylene, polyvinylidene fluoride, or the like, or a combination comprising at least one of the foregoing thermoplastic polymers. Polyesters can be specifically mentioned.

The inorganic filler composition comprises an inorganic filler-polysiloxane composite formed by treating the inorganic filler with a polyorganosiloxane. The inorganic filler composition can optionally comprise an inorganic filler that has not been treated with a polyorganosiloxane. In one embodiment, the inorganic filler composition consists essentially of the inorganic filler-polyorganosiloxane composite. In another embodiment, the inorganic filler composition consists of the inorganic filler-polyorganosiloxane composite, that is, no other filler is present in the thermoplastic composition.

The treated inorganic fillers can include any synthetic or naturally occurring reinforcing agents for polycarbonates and polycarbonate blends. Exemplary fillers are those that produce balanced physical properties and do not degrade the polycarbonate or polycarbonate blend when treated as described herein. In one embodiment the inorganic filler for treatment comprises reactive surface hydroxyl groups. A nonexhaustive list of exemplary inorganic fillers of this type includes talc, mica, clay, and the like. Combinations of fillers can also be used.

In one embodiment, the inorganic filler is talc. A wide variety of talcs can be used. In some embodiments the talc is a fine talc having a particle distribution D50 of less than 10 micrometers, specifically less than 5 micrometers, more specifically less than 3 micrometers. Talcs are commercially available and are known in the art. One example of a suitable talc is a talc having the tradename Jetfine 3CA, which has a particle size distribution D50 of 1.1 micrometers, available from Luzenac.

The inorganic filler-polysiloxane composite is formed by treating the inorganic filler with a polyorganosiloxane, specifically a reactive polyorganosiloxane. A combination of different reactive polyorganosiloxanes can be used. Reactive polyorganosiloxanes comprise units of formula (8) as defined above, specifically formulas (9) or (10) as defined above, together with a group reactive with the inorganic filler. In one embodiment, the reactive polyorganosiloxanes are liquid at room temperature. The reactive polyorganosiloxanes can have a molecular weight from 100 to 6,000, specifically 200 to 5,000, more specifically 500 to 4,000.

The reactive polyorganosiloxanes can have the general formula (19)

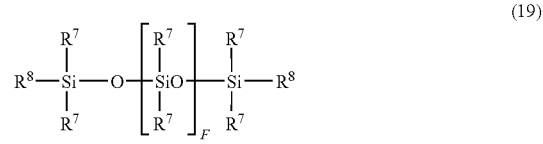

(19)

wherein F has an average value of 5 to 50, specifically 10 to 40. Further in formula (19), each $R^7$ is independently a $C_{1-13}$ monovalent organic group or a $C_{1-13}$ divalent organic group comprising a group reactive with the inorganic filler, and each $R^8$ is a group reactive with the inorganic filler, a $C_{1-13}$ divalent organic group comprising a group reactive with the inorganic filler, or a $C_{1-13}$ monovalent organic group, provided that at least one group reactive with the inorganic filler is present in the molecule. As used herein, "a $C_{1-13}$ divalent organic group comprising a group reactive with the inorganic filler" means that an organic group, e.g., a branched or unbranched alkyl group is substituted with a reactive group, e.g., an amino or hydroxyl group. Further as used herein, when $R^8$ "is a group reactive with the inorganic filler," $R^8$ is itself a reactive group, e.g. an amino or hydroxyl group. The molecular weight of the reactive polyorganosiloxanes can be from 100 to 5,000 Daltons, specifically 200 to 4,000 Daltons, even more specifically 200 to 3,000 Daltons.

In one embodiment, each $R^7$ is independently a $C_{1-13}$ monovalent organic group, and each $R^8$ is independently a group reactive with the inorganic filler or a $C_{1-13}$ divalent organic group comprising a group reactive with the inorganic filler. In another embodiment, each $R^7$ is independently a $C_{1-13}$ monovalent organic group, and each $R^8$ is a group reactive with the inorganic filler, specifically a hydroxyl group.

The $C_{1-13}$ monovalent organic groups of $R^7$ and $R^8$ can be a $C_1$-$C_{13}$ alkyl, $C_1$-$C_{13}$ alkoxy, $C_2$-$C_{13}$ alkenyl, $C_2$-$C_{13}$ alkenyloxy, $C_3$-$C_6$ cycloalkyl, $C_3$-$C_6$ cycloalkoxy, $C_6$-$C_{10}$ aryl, $C_6$-$C_{10}$ aryloxy, $C_7$-$C_{13}$ aralkyl, $C_7$-$C_{13}$ aralkoxy, $C_7$-$C_{13}$ alkaryl, or a $C_7$-$C_{13}$ alkaryloxy. The $C_{1-13}$ divalent organic groups of $R^7$ and $R^8$ can be a $C_1$-$C_{13}$ alkylene, $C_2$-$C_{13}$ alkenylene, $C_6$-$C_{10}$ arylene, $C_7$-$C_{13}$ arylalkylene, or a $C_7$-$C_{13}$ alkylarylene. Any of the foregoing groups can be partially or fully fluorinated. Groups reactive with the inorganic filler can be a primary amino group, secondary amino group, carboxylic acid group, sulfhydryl group, hydroxy group, and the like.

In another specific embodiment, F has an average value of 5 to 50, each $R^7$ is independently a $C_{1-8}$ alkyl, trifluoromethyl, trifluoropropyl, phenyl, chlorophenyl, or tolyl group, and each $R^8$ is a primary amino group, secondary amino group, carboxylic acid group, sulfhydryl group, or a hydroxy group, specifically a hydroxy group. In still another specific embodiment, F has an average value of 10 to 40, each $R^7$ is independently a $C_{1-8}$ alkyl, trifluoropropyl, or phenyl, and each $R^8$ is hydroxy.

Specific examples of polysiloxanes include a silanol-terminated poly(trifluoropropylmethylsiloxane) (20), a silanol-terminated poly(diphenylsiloxane-dimethylsiloxane) copolymer (21), and a silanol-terminated poly(dimethylsiloxane) (22), wherein m is an integer from 10 to 500 and the sum of (g+h) is an integer from 10 to 500.

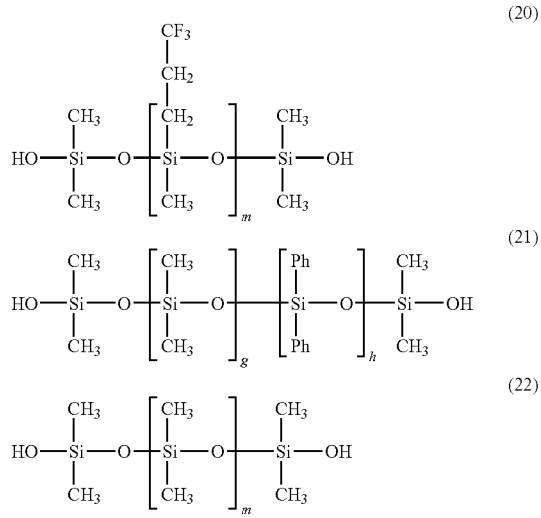

These reactive polyorganosiloxanes have a molecular weight of 100 to 5,000, specifically 400 to 4000 Daltons, and are liquid at 23° C. and higher. In one embodiment it has been found that a better balance between modulus and ductility is obtained when using polyorganosiloxanes of lower molecular weight, e.g., lower than 4,000 Daltons. For example, a composition containing a talc treated with a polydimethylsiloxane having a molecular weight of 2,000 was found to have a better balance of modulus and ductility than the same composition with a talc treated with a polydimethylsiloxane having a molecular weight of 3,000 Daltons. Both compositions exhibited an MAI ductility at −30° C. of 100%. However, the tensile modulus of the compositions containing the talc-polydimethylsiloxane (MW=2,000 Dalton) composite was 4.1 GPa, compared to a tensile modulus of 3.5 GPa for the composition containing the talc-polydimethylsiloxane (MW=3,000 Dalton) composite.

The inorganic filler-polysiloxane composite can be formed by a variety of methods. In one exemplary embodiment the inorganic filler-polysiloxane composite is prepared by dispersing the filler in an inert solvent, adding the polysiloxane to the dispersion, adding a base to the mixture to provide a mixture comprising the filler-polysiloxane composite, and separating the composite from the mixture to form the inorganic filler-polysiloxane composite. Separation can be by different means, for example distillation or filtration.

The amount of reactive polyorganosiloxane used to treat the filler can vary depending on the type of reactive polyorganosiloxane, the type of filler, and the desired properties of the composite. In one exemplary embodiment the inorganic filler is treated with from 0.1 to 25 weight percent, specifically from 5 to 20 weight percent, more specifically from 10 to 15 weight percent of the reactive polyorganosiloxane, based on the total weight of the inorganic filler.

Suitable solvents are inert, usually aprotic, and can be halogenated solvents, for example tetrachloromethane or 1,1,2,2, tetrachloroethane, or other solvents such as toluene, xylene, and the like.

The base is selected so as to promote reaction between the reactive inorganic filler and the reactive polyorganosiloxane. In one embodiment the base is non-nucleophilic. The base can be organic, for example a primary, secondary, or tertiary amine such as pyridine, triethylamine, dimethylamine, and the like, or inorganic, for example ammonium salts, potassium carbonate, and the like.

In a specific exemplary process, the inorganic filler-polysiloxane composite is prepared by dispersing talc in toluene or xylene with stirring at a temperature between 60 to 100° C.; adding the polyorganosiloxane to the dispersion with stirring while maintaining the temperature; adding a non-nucleophilic tertiary organic amine, such as triethylamine with stirring to provide a mixture comprising the filler-polysiloxane composite; and separating the composite from the mixture, for example by distillation or filtration, to form the inorganic filler-polysiloxane composite.

Without being bound by theory, it is believed that the interaction between filler and the polyorganosiloxane can be of two types, chemisorption and physisorption. A chemisorbed interaction involves a chemical bonding (covalent bonding) between the hydroxyl groups of filler and the polyorganosiloxanes in the presence of a base. This is in contrast to physisorption, which occurs due to non-bonding interactions (e.g., via hydrogen bond interactions between the polar functionalities of the filler and the siloxanes). Again without being bound by theory, it is believed that the surface treatment of talc with polyorganosiloxanes described herein exhibits both chemisorbed and physisorbed mechanisms of interaction, such that the mixture comprising the filler-polyorganosiloxanes composite can be produced upon combination of the filler and the polyorganosiloxane, as well as after addition of the base.

It is to be understood that the inorganic filler-polysiloxane composite composition will often comprise a mixture of the inorganic filler-polysiloxane composite itself and "untreated" inorganic filler, that is, filler that is present during the treatment process but that is not associated with the polysiloxane. In one embodiment, the untreated inorganic filler is present in an amount greater than the amount of the inorganic filler-polysiloxane composite. While filler that has not been subjected to the treatment processes described herein can be used in addition to the composite composition (in particular fibrous reinforcing type fillers), it is preferred that any particulate filler present in the composition has been subjected to treatment. In one embodiment, the filler composition consists essentially of the inorganic filler-polysiloxane composite composition, such that no other fillers are present that significantly adversely affect the desired properties of the compositions. In another embodiment, the filler composition consists of the inorganic filler-polysiloxane composite composition, in that no other types of fillers are present.

In another embodiment, an acid is present in the thermoplastic composition. The acid can be added to the components of the composition separately, or the inorganic filler is treated with an acid prior to being combined with the other components of the thermoplastic composition, e.g., the polymer. Acid treatment of the filler can occur prior to treatment with the reactive polysiloxane, after treatment of the filler with the polysiloxane and prior to isolation of the inorganic filler-polysiloxane composite, or after isolation of the inorganic filler-polysiloxane composite. As used herein, treatment with an acid includes treatment with the corresponding acid salt.

The acid can be organic or inorganic. Exemplary inorganic acids include inorganic phosphorus-containing oxyacids, boric acid, hydrohalo acids such as hydrochloric acid, sulphuric acid, and sulphites.

In one embodiment, the acid is an phosphorous-containing oxyacid, in particular a multiprotic phosphorus-containing oxyacid such as phosphoric acid, phosphorous acid, hypophosphorous acid, hypophosphoric acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, or fluorohypophosphoric acid. In one embodiment the multiprotic phosphorus-containing oxyacid is of the general formula $H_mP_tO_n$ wherein m and n are each 2 or greater and t is 1 or greater. Exemplary acids of this type include but are not limited to $H_3PO_4$, $H_3PO_3$, and $H_3PO_2$. When an acid salt is used, the counter ion is not particularly limited, and can be, for example, an earth metal, an alkaline earth metal, or a metal such as zinc. Specific salts include mono zinc phosphate, mono calcium phosphate, mono natrium phosphate, sodium acid pyrophosphate, and the like. A combination of different acids can be used, which includes combinations of a protic acid and an acid salt.

The amount of acid is selected so as to provide improved properties such as flow and molecular weight retention, and can be determined without undue experimentation. In one embodiment the amount of acid is selected so as to provide a weight ratio of acid to filler of at least 0.001:1, more specifically at least 0.01:1, specifically up to 0.1:1.

A convenient process for acid treatment uses an aqueous solution of a phosphorous acid, e.g., a water solution containing 20 to 60 weight percent, specifically 45 weight percent of phosphorous acid. In one exemplary procedure, a preparation of 45 weight percent phosphorous acid solution (450 g of acid in 1 L of water) is added to the isolated talc-polyorganosiloxane composite to provide the desired amount of acid (e.g., 1 kg of talc per 30 g of 45 weight percent aqueous acid), and thoroughly mixed. The acid-treated composite can then be used directly, or stored prior to use. In another exemplary process, the acid (e.g., 45 weight percent aqueous phosphorous acid) is added to the other components of the thermoplastic composition during manufacture of the composition. In still another exemplary process, the talc-polyorganosiloxane composite is treated with an acid, and an acid is added to the components of the composition during manufacture of the composition.

The thermoplastic composition can be prepared by combining inorganic filler-polysiloxane composite, and optionally the acid, with the thermoplastic polymer component, e.g., a polycarbonate, an impact modifier, and an optional polycarbonate-polysiloxane copolymer.

The relative amounts of each component are selected based on the desired properties of the thermoplastic composition using the below guidelines. In one embodiment, the thermoplastic composition comprises 70 to 99.9 weight percent, specifically 75 to 99 weight percent, of a thermoplastic polymer component, based on the total weight of the thermoplastic composition (i.e., polymer, filler, impact modifier, acid, and other additives). The thermoplastic polymer component can comprise one or more thermoplastic polymers.

In a specific embodiment, the thermoplastic composition comprises polycarbonate in an amount up to 80 weight percent, specifically 50 to 80 weight percent, more specifically 65 to 80 weight percent, each based on the total weight of the thermoplastic composition.

The impact modifier is present in the thermoplastic composition in an amount of 1 to 25 weight percent, specifically 5 to 15 weight percent, each based on the total weight of the thermoplastic composition.

The polycarbonate-polysiloxane copolymer is present in the thermoplastic composition in an amount of 0 to 25 weight percent, specifically 1 to 15 weight percent, each based on the total weight of the thermoplastic composition.

The inorganic filler composition is present in the thermoplastic composition in an amount from 0.1 to 30 weight percent, specifically 0.1 to 25 weight percent, each based on the total weight of the thermoplastic composition.

The amount of acid used in the composition can be based on the amount of filler as described above, or on the total weight of the thermoplastic composition. For example, the composition may further comprise about 0.01 to about 5 weight percent acid, specifically about 0.05 to about 2 weight percent acid, and in some embodiments about 0.1 to about 1 weight percent acid, based on the total weight of the composition.

In a specific embodiment, the thermoplastic composition comprises up to 80 weight percent of the polycarbonate; from 1 to 25 weight percent of an impact modifier; from 0 to 25 weight percent of polycarbonate-polysiloxane copolymer; from 0.5 to 2 weight percent of an acid; and from 0.1 to 30 weight percent of an inorganic filler composition comprising an inorganic filler-polysiloxane composite. In another embodiment, the thermoplastic composition comprises from 65 to 80 weight percent of the polycarbonate; from 1 to 20 weight percent of an impact modifier; from 0 to 20 weight percent of polycarbonate-polysiloxane copolymer; from 0.5 to 2 weight percent of an acid; and from 0.1 to 25 weight percent of an inorganic filler composition comprising a talc filler-polysiloxane composites. All of the foregoing weight percent values are based on the combined weight of composition.

In addition to the above components, the thermoplastic composition can include various additives ordinarily incorporated in resin compositions of this type, with the proviso that the additives are selected so as to not significantly adversely affect the desired properties of the thermoplastic composition, for example, impact strength. Combinations of additives can be used. Such additives can be mixed at a suitable time during the mixing of the components for forming the composition.

The blends can further comprise flame retardants. Useful flame retardants include organic compounds that include phosphorus, bromine, and/or chlorine. Non-brominates and non-chlorinated phosphorus-containing flame retardants can be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or aralkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

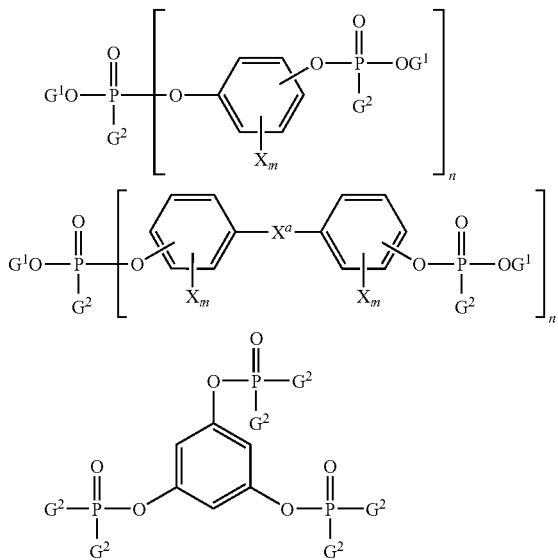

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m is 0 to 4, and n is 1 to 30. Exemplary di- or polyfunctional aromatic phosphorus-containing compounds include resorcinol tetraphenyl diphosphate (RDP), the bis(diphenyl) phosphate of hydroquinone and the bis(diphenyl) phosphate of bisphenol A, respectively, their oligomeric and polymeric counterparts, and the like.

Exemplary flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphate oxide. When present, phosphorus-containing flame retardants are generally present in amounts of 1 to 10 parts by weight, based on 100 parts by weight of the total composition.

Halogenated materials can also be used as flame retardants, for example halogenated compounds and resins of formula (23):

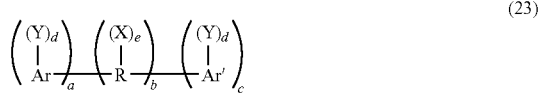

(23)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (23) are each independently mono- or polycarbocyclic aromatic groups such as phenylene, biphenylene, terphenylene, naphthylene, or the like.

Y is an organic, inorganic, or organometallic group, for example (1) halogen, e.g., chlorine, bromine, iodine, fluorine or (2) ether groups of the general formula OB, wherein B is a monovalent hydrocarbon group similar to X or (3) monovalent hydrocarbon groups of the type represented by R or (4) other substituents, e.g., nitro, cyano, and the like, said substituents being essentially inert provided that there is greater than or equal to one, specifically greater than or equal to two, halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are generally present in amounts of 0.1 to 20 parts by weight, more specifically 1 to 15 parts by weight, based on 100 parts by weight of the total composition.

Inorganic flame retardants can also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of 1 to 10 parts by weight, more specifically 0.05 to 5 parts by weight, based on 100 parts by weight of the total composition.

Anti-drip agents can also be used in the composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 weight percent PTFE and 50 weight percent SAN, based on the total weight of the encapsulated fluoropolymer. The SAN can comprise, for example, 75 weight percent styrene and 25 weight percent acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer. Antidrip agents are generally used in amounts of 0.1 to 1.4 percent by weight, based on the weight of the total composition.

Exemplary antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of 0.1 to 1 parts by weight, based on 100 parts by weight of the total composition.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.1 to 5 parts by weight, based on 100 parts by weight of the total composition.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of 0.1 to 5 parts by weight, based on 100 parts by weight of the total composition.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[[(2-cyano-3,3-diphenylacryloyl)oxy]-2,2-bis[[(2-cyano-3,3-diphenylacryloyl)oxy]methyl]propane (UVINUL® 3030); 2,2'-(1,4-phenylene)bis (4H-3,1-benzoxazin-4-one); 1,3-bis[[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers; or the like, or combinations comprising at least one of the foregoing UV absorbers. UV absorbers are generally used in amounts of 1 to 10 parts by weight, based on 100 parts by weight of the total composition.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.1 to 10 parts by weight, based on 100 parts by weight of the total composition.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 (Sanyo) or PEBAX® MH1657 (Atofina), IRGASTAT® P18 and P22 (Ciba-Geigy). Other polymeric materials that can be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or a combination comprising at least one of the foregoing can be used in a polymeric resin containing chemical antistatic agents to render the composition electrostatically dissipative. Antistatic agents are generally used in amounts of 0.1 to 3 parts by weight, based on 100 parts by weight of the total composition.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.1 to 5 parts by weight, based on 100 parts by weight of the total composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 10 parts by weight, based on 100 parts by weight of the total composition.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9-decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group ($-CH_2OH$) or it can be a member of a more complex hydrocarbon group such as $-CR^4HOH$ or $-CR_2^4OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds can be used in amounts of 0.001 to 1 parts by weight based on 100 parts by weight of the total composition.

The thermoplastic compositions can be manufactured by various methods. For example, powdered polycarbonate, impact modifier, inorganic filler-polysiloxane composite, optional polycarbonate-polysiloxane copolymer and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

The thermoplastic compositions described herein have an excellent balance of properties, in particular improved stability, together with advantageous modulus, ductility, and flow properties.

Improved stability can be determined using polymer molecular weight. Polymer molecular weight is measured by gel permeation chromatography (GPC) in methylene chloride solvent using polystyrene calibration standards to determine and report relative molecular weights (values reported are polycarbonate molecular weight relative to polystyrene, not absolute polycarbonate molecular weight numbers). Changes in weight average molecular weight are typically used. This provides a means of measuring changes in chain length of a polymeric material, which can be used to determine the extent of degradation of the thermoplastic as a result of exposure processing. Degraded materials would generally show reduced molecular weight, and could exhibit reduced physical properties. Typically, molecular weights are determined before and after processing, and the molecular weight retention is the molecular weight after processing as a percentage of the molecular weight before processing.

The polycarbonate in the thermoplastic compositions described herein retains at least 80 to 98%, specifically at least 85 to 98%, more specifically at least 90 to 98% of its initial weight average molecular weight after processing, i.e., after extrusion.

Articles molded from the thermoplastic compositions can have a tensile modulus (E), specifically a Young's modulus, of 3 to 6 GPa, specifically 3.5 to 5 GPa. Articles molded from the thermoplastic compositions can further have a stress at yield of 50 to 90 MPa, specifically 55 to 80 MPa. The elongation at break can be greater than 20%, specifically greater than 30%. All of the foregoing properties are determined in accordance with ISO 527-5:1997.

Flexural modulus is based on the ISO 178:2004 method. Test bars have the following dimensions: 80 mm×10 mm×4 mm (±0.2 mm). The final test results are calculated as the average of test results of five test bars. The flexural modulus is the ratio, within the elastic limit, of stress to corresponding strain and is expressed in Gigapascals (GPa). Test bars molded from the thermoplastic compositions can have a flexural modulus of 3 to 6 GPa, specifically 3.5 GPa, measured in accordance with ISO 178:2004.

Flexural strength of the compositions can be 70 to 120 MPa, specifically 80 to 110 MPa, measured in accordance with ISO 178:2004.

Multi-axial impact (MAI) performance data are measured according to ISO 6603-2:2000 at −30, −20, −10, 0, and 23° C. The test provides information on how a material behaves under multi-axial deformation conditions. The deformation is applied using a punch at a known velocity ranging from 2 to 5 m/sec. Results are expressed in Joules as total impact energy. The fracture mechanism of the sample is also reported as a % of ductility. MAI percent ductility (at a given temperature, such as −30 or 23° C.) is reported as the percentage of five samples which, upon failure in the impact test, exhibited a ductile failure rather than rigid failure, the latter being characterized by cracking and the formation of shards. Articles molded from the thermoplastic compositions can have an MAI of 60 to 140 J, specifically 70 to 130 J, and more specifically 75 to 125 J at a temperature of −30° C. Also, the articles molded from the thermoplastic compositions have 100% ductility at −30° C.

Izod Impact Strength ISO 180 ('NII') is used to compare the impact resistances of plastic materials. Izod Impact was determined using a 3.2 mm thick, molded Izod notched impact (INI) bar. It was determined per ISO 180/1A. The ISO designation reflects type of specimen and type of notch: ISO 180/1A means specimen type 1 and notch type A. ISO 180/1U means the same type 1 specimen, but clamped in a reversed way, (indicating unnotched). The ISO results are defined as the impact energy in joules used to break the test specimen, divided by the specimen area at the notch. Results are reported in $kJ/m^2$.

The thermoplastic compositions can have a notched Izod impact (NII) of 10 to 50 kilojoules per square meter ($kJ/m^2$) measured at 23° C., specifically 10 to 15 $kJ/m^2$, measured at −30° C., both using ⅛-inch (3.2 mm) thick bars in accordance with ISO 180:2000.

Melt Volume Rate (MVR) was determined at 260° C. or 300° C., as indicated, using a 5-kilogram weight, over 10 minutes, in accordance with ISO 1133. The thermoplastic compositions can have a melt volume flow ratio (MVR) of 1 to 30, specifically 2 to 20 centimeters per 10 minutes ($cm^3/10$ min), when measured at 260° C. under a load of 5.0 Kg in accordance with ISO 1133.

The thermoplastic compositions can have a melt viscosity at 300° C./5000 $sec^{-1}$ of less than 70 Pascal-seconds, measured in accordance with ISO 11443.

The thermoplastic compositions can have a heat deflection temperature (HDT) of greater than 118° C., was measured at 1.8 MPa on 6.4 mm thick bars according to ISO 75.

Vicat Softening Temperature (ISO 306) is a measure of the temperature at which a plastic starts to soften rapidly. A round, flat-ended needle of 1 $mm^2$ cross section penetrates the surface of a plastic test specimen under a predefined load, and the temperature is raised at a uniform rate. The Vicat softening temperature, or VST, is the temperature at which the penetration reaches 1 mm. ISO 306 describes two methods: Method A—load of 10 Newtons (N), and Method B—load of 50 N, with two possible rates of temperature rise: 50° C./hour (° C./h) or 120° C./h. This result in ISO values quoted as A/50, A/120, B/50 or B/120. The test assembly is immersed in a heating bath with a starting temperature of 23° C. After 5 minutes (min) the load is applied: 10 N or 50 N. The temperature of the bath at which the indenting tip has penetrated by 1±0.01 mm is reported as the VST of the material at the chosen load and temperature rise.

The thermoplastic compositions can have Vicat softening temperature (VST) of greater than 135° C., when measured according to the ISO 306 test, Method B. The sample is subject to 50 N and the heating rate for the test is 50° C./hour.

Shaped, formed, or molded articles comprising the thermoplastic compositions are also provided. The thermoplastic compositions can be molded into useful shaped articles by a variety of means such as injection molding, extrusion, rotational molding, blow molding, and thermoforming to form a variety of different articles.

Specific exemplary articles include, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, electronic device casings and signs and the like. In addition, the thermoplastic compositions can be used for such applications as automotive parts, including panel and trim, spoilers, luggage doors, body panels, as well as walls and structural parts in recreation vehicles. The compositions are particularly useful for load-bearing components, particularly load-bearing automotive components.

The thermoplastic compositions are further illustrated by the following non-limiting examples, which use the following components.

EXAMPLES

The thermoplastic compositions described in the following examples were prepared from the components described in Table 1.

TABLE 1

| Component | Supplier | Description |
|---|---|---|
| PC-1 | SABIC Innovative Plastics | BPA polycarbonate resin made by an interfacial process with an MVR at 300° C./1.2 kg, of 5.1-6.9 g/10 min. |
| PC-2 | SABIC Innovative Plastics | BPA polycarbonate resin made by the interfacial process with an MVR at 300° C./1.2 kg, of 23.5-28.5 g/10 min. |
| PC-3 | SABIC Innovative Plastics | BPA polycarbonate resin made by an interfacial process with an MVR at 300° C./1.2 kg, of 5.1-6.9 g/10 min. |
| PC-4 | SABIC Innovative Plastics | Polysiloxane-polycarbonate copolymer comprising units derived from BPA and units derived from formula (10), wherein n is 0, $R^2$ is propylene, R is methyl, and E has an average value of 50, absolute weight average molecular weight of 30000 g/mol, and a dimethylsiloxane content of 20 wt. % |
| MBS | Rohm & Haas | Nominal 75-82 weight percent butadiene core with a balance styrene-methyl methacrylate shell, available under the tradename EXL-2691-A |
| PolySAN-1 | SABIC Innovative Plastics | Styrene acrylonitrile copolymer comprising 15-35 wt. % acrylonitrile with an Melt Flow of 18-24 $cm^3$/10 min at 220° C./1.2 kg |
| PolySAN-2 | SABIC Innovative Plastics | High flow bulk styrene acrylonitrile copolymer comprising 15-35 wt. % acrylonitrile with an Melt Flow of 5.2-7.2 g/10 min at 190° C./2.16 kg |
| FMS | Gelest | Silanol-terminated poly(trifluoropropylmethylsiloxane) (MW = 550-800) |
| PDS | Gelest | Silanol-terminated poly(diphenylsiloxane) |
| PDMS | Gelest | Silanol-terminated poly(dimethylsiloxane) |
| TSAN | SABIC Innovative Plastics | Polytetrafluoroethylene (PTFE) encapsulated by a styrene-acrylonitrile copolymer (SAN) (Anti-drip agent) |
| Talc | Luzenac | Trade name Jetfine 3CA |

In each of the examples, samples were prepared by melt extrusion on a Werner & Pfleiderer™ 25 mm twin screw extruder at a nominal melt temperature of about 280° C., about 0.7 bars of vacuum, and about 450 rpm. The extrudate was pelletized and dried at about 100° C. for about 2 hours. To make test specimens, the dried pellets were injection molded on an 110-ton injection molding machine at a nominal melt temperature of 300° C., with the melt temperature approximately 5 to 10° C. higher.

Various properties of the compositions were determined as described above. Additional detail regarding determination of certain properties is described below.

Molecular weight was measured by gel permeation chromatography (GPC) in methylene chloride solvent, and polystyrene calibration standards were used to determine and report relative molecular weights (values reported are polycarbonate molecular weight relative to polystyrene, not absolute polycarbonate molecular weight numbers). Changes in weight average molecular weight were used to determine polymer stability before and after processing. Molecular weight retention is the molecular weight after processing as a percentage of the molecular weight before processing.

Tensile properties such as tensile strength and tensile elongation to break were determined using 4 mm thick molded tensile bars tested per ISO 527 at 5 mm/min. It is also possible to measure at 50 mm/min. if desired for the specific application, but the samples measured in the experiments were measured at 5 mm/min. Tensile modulus is always measured at the start of the test with an initial rate of 1 mm/min, after which the test is continued at either 5 mm/min. or 50 mm/min. to measure the other tensile properties.

In the following Examples, "E" designates an example in accordance with the invention, and "C" designates a comparative example. All amounts are in weight percent, unless specified otherwise.

Examples E1-E6

Table 2 shows the properties of thermoplastic compositions and articles molded from the compositions. Each composition was made using 92 wt. % of a composition containing the following: 11.55 wt. % of PC-2, 65.7 wt. % of PC-3, 4.4 wt. % of MBS, 9.5 wt. % of PolySAN-1, and 0.8 wt. % of mold release and stabilizer package. Each composition further contained 8 wt. % of a talc (C1) or talc-polyorganosiloxane composite. The weight percent of polysiloxane used to treat the talc is shown in Table 2.

Each treated talc was obtained by treating 1000 g of talc with the indicated amount of polyorganosiloxane (wt. % of FMS, PDS, or PMDS, based on the combined weight of the talc and polyorganosiloxane, and as indicated in Table 2) and triethylamine (10 to 15 g) in toluene or xylene (3 L). After stirring for 6 hours at 65 to 80° C., the composite was isolated by distillation or filtration.

No acid treatment of the talc was performed and no acid is present in the compositions.

TABLE 2

|  | Unit | C1 | E1 | E2 | E3 | E4 | E5 | E6 |
|---|---|---|---|---|---|---|---|---|
| Component | | | | | | | | |
| FMS-treated talc | Wt % | — | 10 | 15 | — | — | — | — |
| PDS-treated talc | Wt % | — | — | — | 10 | 15 | — | — |
| PDMS-treated talc | Wt % | — | — | — | — | — | 10 | 15 |
| Property | | | | | | | | |
| Ash Content | Wt % | 7.8 | 7.3 | 7.2 | 7.6 | 6.9 | 7.4 | 7.3 |
| Extrusion PC Mw retention | % | 95 | 97 | 96 | 96 | 96 | 97 | 97 |
| Molding PC Mw retention | % | 88 | 89 | 91 | 91 | 88 | 90 | 89 |
| Overall PC Mw retention | % | 84 | 86 | 87 | 88 | 85 | 87 | 86 |
| Flexural Modulus | MPa | 3030 | 2977 | 2980 | 2967 | 2913 | 2907 | 2844 |
| Flexural Strength | MPa | 94 | 92 | 92 | 91 | 89 | 89 | 88 |
| Tensile Modulus | MPa | 3149 | 3092 | 3072 | 3098 | 3032 | 3040 | 2967 |
| Stress at yield | MPa | 61 | 59 | 59 | 58 | 58 | 57 | 56 |
| Stress at break | MPa | 58 | 58 | 58 | 58 | 56 | 58 | 57 |
| Strain at yield | % | 4.5 | 4.5 | 4.5 | 4.5 | 4.6 | 4.5 | 4.6 |
| Elongation | % | 86 | 91 | 88 | 89 | 83 | 94 | 92 |
| HDT 1.8 MPa flat | °C. | 122.0 | 120.7 | 121.4 | 121.3 | 120.8 | 121.8 | 121.6 |
| Vicat B/50 | °C. | 138.6 | 138.0 | 138.1 | 137.9 | 137.8 | 138.6 | 138.4 |
| INI 23° C. | kJ/m$^2$ | 11.2 | 18.7 | 20.0 | 21.6 | 36.5 | 41.3 | 44.5 |
| INI 0° C. | kJ/m$^2$ | 10.3 | 12.6 | 12.7 | 12.9 | 14.4 | 16.5 | 18.5 |
| INI −10° C. | kJ/m$^2$ | 10.5 | 12.0 | 12.4 | 12.0 | 12.9 | 15.3 | 17.3 |
| INI −20° C. | kJ/m$^2$ | 10.1 | 11.7 | 11.4 | 11.6 | 12.1 | 13.7 | 16.0 |
| INI −30° C. | kJ/m$^2$ | 9.6 | 10.8 | 10.9 | 11.0 | 11.4 | 12.9 | 14.9 |
| MAI 23° C. Ductility | % | 100 | 100 | 100 | 100 | 100 | 100 | 100 |
| MAI 0° C. Ductility | % | 100 | 100 | 100 | 100 | 100 | 100 | 100 |
| MAI −10° C. Ductility | % | 70 | 100 | 100 | 100 | 100 | 100 | 100 |
| MAI −20° C. Ductility | % | 0 | 90 | 80 | 90 | 80 | 100 | 100 |
| MAI −30° C. Ductility | % | 0 | 30 | 80 | 50 | 40 | 70 | 75 |
| MAI 23° C. Puncture Energy | J | 102 | 109 | 103 | 107 | 99 | 94 | 94 |
| MAI 0° C. Puncture | J | 95 | 102 | 100 | 102 | 97 | 96 | 91 |
| MAI −10° C. Puncture | J | 96 | 102 | 95 | 99 | 92 | 96 | 90 |
| MAI −20° C. Puncture | J | 92 | 97 | 102 | 94 | 101 | 99 | 96 |
| MAI −30° C. Puncture | J | 99 | 94 | 96 | 98 | 93 | 88 | 86 |
| MVR 260° C. 5 kg | cm$^3$/10 min | 12.4 | 12.3 | 12.3 | 12.0 | 12.3 | 11.8 | 11.7 |
| MVR 260° C. 5 kg dwell | cm$^3$/10 min | 12.7 | 12.9 | 12.2 | 13.1 | 13.3 | 12.1 | 12.1 |
| MV at 260° C. at shear rate 100 | Pa·s | 902 | 846 | 938 | 947 | 830 | 926 | 838 |
| 500 | Pa·s | 502 | 496 | 490 | 542 | 492 | 526 | 480 |
| 1000 | Pa·s | 371 | 373 | 381 | 385 | 357 | 377 | 351 |
| 1500 | Pa·s | 300 | 306 | 315 | 313 | 295 | 310 | 304 |
| 5000 | Pa·s | 143 | 145 | 148 | 146 | 141 | 147 | 148 |
| 10000 | Pa·s | 88 | 90 |  | 90 | 87 | 89 | 92 |
| MV at 300° C. at shear rate 100 | Pa·s | 255 | 251 | 277 | 219 | 192 | 228 | 241 |
| 500 | Pa·s | 178 | 171 | 162 | 151 | 139 | 174 | 168 |
| 1000 | Pa·s | 149 | 141 | 142 | 137 | 123 | 140 | 133 |
| 1500 | Pa·s | 128 | 123 | 125 | 119 | 112 | 120 | 110 |
| 5000 | Pa·s | 70 | 68 | 69 | 66 | 64 | 66 | 59 |
| 10000 | Pa·s | 46 | 46 | 47 | 44 | 43 | 45 | 42 |

As can be seen from the data in Table 2, use of the talc-polysiloxane composite results in improved properties, in particular INI and MAI % ductility. without significantly reducing the tensile modulus, strength, elongation, HDT, and Vicat properties. Without being bound by theory, it is believed that the enhancement in INI and MAI % ductility is due to the presence of an elastomeric interface region (polyorganosiloxane) between the inorganic filler and polymer matrix. Furthermore, the low glass transition temperature (−120° C.) of the elastomeric interface enhances the low temperature INI and MAI % ductility properties.

Examples E7-E11

Table 3 shows the properties of thermoplastic compositions and articles molded from the compositions. Each composition was made using 92 wt. % of a composition containing the following: 11.55 wt. % of PC-2, 65.7 wt. % of PC-3, 4.4 wt. % of MBS, 9.5 wt. % of PolySAN-1, and 0.85 wt. % of a mold release and stabilizer package). Each composition further contained 8 wt. % of a talc (C2 and C3) or a talc-polyorganosiloxane composite, prepared as in Examples E1-E6.

The amount of polysiloxane used to treat the talc is shown in Table 3 (wt. %, based on the total weight of the talc and the polyorganosiloxane). The composite was prepared as described for Examples E1-E6, followed by acid treatment after isolation of the composite. Acid treatment was performed using 30 g of 45 wt. % aqueous phosphorous acid to treat 1 kg of composite. The acid-treated composite was then mixed with the remaining components of the thermoplastic composition.

TABLE 3

|  | Unit | C2 | C3 | E7 | E8 | E9 | E10 | E11 |
| --- | --- | --- | --- | --- | --- | --- | --- | --- |
| Component |  |  |  |  |  |  |  |  |
| Acid Stabilized talc |  | yes | no | yes | yes | yes | yes | yes |
| FMS-treated talc | Wt % | — | — | 10 | 15 | — | — | — |
| PDS-treated talc | Wt % | — | — | — | — | 15 | — | — |
| PDMS-treated talc | Wt % | — | — | — | — | — | 10 | 15 |
| Property |  |  |  |  |  |  |  |  |
| Ash Content | % | 7.9 | 7.8 | 7.5 | 7.3 | 7.4 | 7.6 | 7.9 |
| Extrusion PC Mw retention | % | 99 | 95 | 98 | 98 | 99 | 98 | 96 |
| Molding PC Mw retention | % | 98 | 88 | 95 | 98 | 95 | 96 | 99 |
| Overall PC Mw retention | % | 96 | 84 | 94 | 96 | 94 | 95 | 94 |
| Flexural Modulus | MPa | 3051 | 3030 | 3014 | 3020 | 2919 | 2924 | 2880 |
| Flexural Strength | MPa | 94 | 94 | 92 | 91 | 89 | 88 | 87 |
| Tensile Modulus | MPa | 3136 | 3149 | 3148 | 3126 | 3032 | 3031 | 2998 |
| Stress at yield | MPa | 60 | 61 | 57 | 57 | 56 | 56 | 55 |
| Stress at break | MPa | 60 | 58 | 53 | 64 | 62 | 61 | 61 |
| Strain at yield | % | 4.6 | 4.5 | 4.5 | 4.8 | 4.8 | 4.8 | 4.8 |
| Elongation | % | 96 | 86 | 106 | 109 | 104 | 102 | 101 |
| HDT 1.8 MPa flat | ° C. | 122.5 | 122.0 | 120.7 | 119.8 | 119.0 | 120.0 | 119.2 |
| Vicat B/50 | ° C. | 139.7 | 138.6 | 136.9 | 137.1 | 136.9 | 137.2 | 137.0 |
| INI 23° C. | $kJ/m^2$ | 38.1 | 11.2 | 58.2 | 56.6 | 55.8 | 63.4 | 63.4 |
| INI 0° C. | $kJ/m^2$ | 15.6 | 10.3 | 39.3 | 38.5 | 40.8 | 42.8 | 40.4 |
| INI –10° C. | $kJ/m^2$ | 13.9 | 10.5 | 20.5 | 20.7 | 22.2 | 24.0 | 28.3 |
| INI –20° C. | $kJ/m^2$ | 12.9 | 10.1 | 18.4 | 17.8 | 19.5 | 20.9 | 20.8 |
| INI –30° C. | $kJ/m^2$ | 12.1 | 9.6 | 16.5 | 16.6 | 17.3 | 17.9 | 19.5 |
| MAI 23° C. Ductility | % | 100 | 100 | 100 | 100 | 100 | 100 | 100 |
| MAI 0° C. Ductility | % | 100 | 100 | — | — | — | — | — |
| MAI –10° C. Ductility | % | 100 | 70 | 100 | 100 | 100 | 100 | 100 |
| MAI –20° C. Ductility | % | 100 | 0 | 100 | 100 | 100 | 100 | 100 |
| MAI –30° C. Ductility | % | 90 | 0 | 80 | 100 | 100 | 100 | 100 |
| MAI 23° C. Puncture | J | 90 | 102 | 89 | 98 | 104 | 103 | 98 |
| MAI 0° C. Puncture | J | 95 | 95 | — | — | — | — | — |
| MAI –10° C. Puncture | J | 97 | 96 | 99 | 97 | 98 | 98 | 90 |
| MAI –20° C. Puncture | J | 98 | 92 | 98 | 101 | 101 | 96 | 95 |
| MAI –30° C. Puncture | J | 102 | 99 | 46 | 98 | 100 | 99 | 93 |
| MVR 260° C. 5 kg | $cm^3/10$ min | 10.8 | 12.4 | 11.3 | 11.2 | 11.7 | 10.8 | 11.4 |
| MVR 260° C. 5 kg dwell | $cm^3/10$ min | 11.1 | 12.7 | 12.7 | 12.9 | 13.5 | 12.4 | 12.0 |
| MV at 260° C. at shear rate 100 | Pa · s | 988 | 902 | 923 | 1135 | 1127 | 1115 | 1014 |
| 500 | Pa · s | 588 | 502 | 567 | 604 | 607 | 583 | 513 |
| 1000 | Pa · s | 418 | 371 | 424 | 426 | 430 | 430 | 391 |
| 1500 | Pa · s | 341 | 300 | 341 | 340 | 347 | 351 | 331 |
| 5000 | Pa · s | 159 | 143 | 157 | 155 | 155 | 157 | 150 |
| 10000 | Pa · s | — | 88 | — | — | — | — | — |
| MV at 300° C. at shear rate 100 | Pa · s | 259 | 255 | 325 | 333 | 309 | 333 | 337 |
| 500 | Pa · s | 198 | 178 | 203 | 198 | 191 | 193 | 194 |
| 1000 | Pa · s | 164 | 149 | 165 | 158 | 154 | 154 | 151 |
| 1500 | Pa · s | 140 | 128 | 141 | 136 | 133 | 135 | 129 |
| 5000 | Pa · s | 75 | 70 | 75 | 74 | 72 | 74 | 72 |
| 10000 | Pa · s | 51 | 46 |  | 50 | 49 | 50 | 49 |

Comparing the results from Table 2 and Table 3, it can be observed that the use of the acid-treated talc-polysiloxane composite results in improved retention of molecular weight in the polycarbonate, which in turn enhances the Notched Izod Impact strength and MAI % ductility. Flow (MV and MVR) also slightly increased, providing a very good balance between impact properties and flow. The acid-treated talc-polyorganosiloxane composite gives a robust MAI % ductility at –30° C.

Examples E12-E15

Table 4 shows a comparison of the properties of compositions containing different weight fractions of talc versus compositions containing polysiloxane-talc composites, wherein each of the compositions further contained the indicated amount of phosphorus acid. The example C5, C6, E14 and E15 has a higher amount of PolySAN, in order to determine the modulus-impact-flow balance.

The polysiloxane-talc composite was prepared as described for examples E7-E11, using 10 wt. % PDMS.

TABLE 4

|  | | C3 | E12 | C4 | E13 | C5 | E14 | C6 | E15 |
|---|---|---|---|---|---|---|---|---|---|
| PC-2 | % | 57.49 | 57.49 | 53.37 | 53.37 | 33.93 | 33.93 | 31.36 | 31.36 |
| PC-3 | % | 14.37 | 14.37 | 13.34 | 13.34 | 33.93 | 33.93 | 31.36 | 31.36 |
| PolySAN-2 | % | 9.5 | 9.5 | 9.5 | 9.5 | 13.5 | 13.5 | 13.5 | 13.5 |
| MBS | % | 4.4 | 4.4 | 4.4 | 4.4 | 4.4 | 4.4 | 4.4 | 4.4 |
| $H_3PO_4$, 45% in $H_2O$ | % | 0.39 | 0.39 | 0.54 | 0.54 | 0.39 | 0.39 | 0.54 | 0.54 |
| Jetfine Talc | % | 13 | — | 18 | — | 13 | — | 18 | — |
| PDMS Talc Composite | % | — | 13 | — | 18 | — | 13 | — | 18 |
| Property | Unit | | | | | | | | |
| Overall PC Mw retention | % | 98.87 | 98.36 | 97.99 | 97.91 | 96.71 | 96.99 | 97.40 | 96.45 |
| Tensile Modulus | GPa | 3.95 | 3.74 | 4.67 | 4.00 | 4.04 | 3.65 | 4.82 | 4.53 |
| Stress at yield | MPa | 70.80 | 64.90 | 72.80 | 64.50 | 72.30 | 66.20 | 72.10 | 64.10 |
| Stress at break | MPa | 52.80 | 70.20 | 45.90 | 54.60 | 37.90 | 41.10 | 43.90 | 43.90 |
| Strain at yield | % | 4.00 | 4.40 | 3.60 | 4.00 | 4.00 | 4.20 | 3.40 | 3.80 |
| Elongation | % | 81.8 | 112.40 | 18.90 | 83.40 | 29.00 | 79.50 | 9.10 | 30.50 |
| INI 23° C. | $kJ/m^2$ | 41.19 | 69.37 | 34.99 | 80.82 | 41.86 | 64.67 | 31.12 | 69.76 |
| INI −10° C. | $kJ/m^2$ | 38.46 | 66.40 | 41.44 | 65.94 | 33.80 | 52.77 | 28.99 | 61.30 |
| MAI 23° C. Ductility | % | — | — | — | — | 100.00 | 100.00 | 50.00 | 100.00 |
| MAI 0° C. Ductility | % | — | — | — | — | 100.00 | 100.00 | 0.00 | 100.00 |
| MAI −10° C. Ductility | % | 100.00 | 100.00 | 100.00 | 100.00 | 83.00 | 100.00 | 0.00 | 100.00 |
| MAI −20° C. Ductility | % | 100.00 | 100.00 | 16.00 | 100.00 | — | — | — | — |
| MAI −30° C. Ductility | % | 33.00 | 100.00 | 0.00 | 100.00 | — | — | — | — |
| MAI 23° C. Puncture | J | — | — | — | — | 120.00 | 110.00 | 100.00 | 102.00 |
| MAI 0° C. Puncture | J | — | — | — | — | 106.00 | 113.00 | 46.00 | 110.00 |
| MAI −10° C. Puncture | J | 113.00 | 113.00 | 92.00 | 106.00 | 104.00 | 109.00 | 23.00 | 90.00 |
| MAI −20° C. Puncture | J | 107.00 | 116.00 | 64.00 | 105.00 | — | — | — | — |
| MAI −30° C. Puncture | J | 92.00 | 117.00 | 54.00 | 108.00 | — | — | — | — |
| MVR 260° C. 5 kg | $cm^3/10\ min$ | 8.20 | 8.90 | 7.00 | 9.00 | 13.50 | 16.00 | 12.30 | 14.60 |

In comparison to the talc formulations, the polyorganosiloxane-talc composite compositions show an improved INI and MAI % ductility at −10° C. and −30° C. with marginal reduction in tensile modulus. The formulations with 2% higher PolySAN shows a significant improvement in flow properties (MVR). The polydimethylsiloxane-talc composite compositions also show an improvement in flow properties over the comparative examples. From Table 4 it can also be observed that with increase in weight fraction of polysiloxane-talc composite the modulus increases and the INI and MAI % ductility was retained robustly at −30° C.

The singular forms "a," "an," and "the" include plural referents unless the context clearly dictates otherwise. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. The endpoints of all ranges directed to the same component or property are inclusive of the endpoint and independently combinable. All references are incorporated herein by reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The term "substituted" as used herein means that any at least one hydrogen on the designated atom or group is replaced with another group, provided that the designated atom's normal valence is not exceeded. When the substituent is oxo (i.e., =O), then two hydrogens on the atom are replaced. Also as used herein, the term "combination" is inclusive of blends, mixtures, alloys, reaction products, and the like. An "organic group" as used herein means a saturated or unsaturated (including aromatic) hydrocarbon having a total of the indicated number of carbon atoms and that can be unsubstituted or unsubstituted with one or more of halogen, nitrogen, sulfur, or oxygen, provided that such substituents do not significantly adversely affect the desired properties of the composition, for example transparency, heat resistance, or the like. Exemplary substituents include alkyl, alkenyl, alkynyl, cycloalkyl, aryl, alkylaryl, arylalkyl, —NO₂, SH, —CN, OH, halogen, alkoxy, aryloxy, acyl, alkoxy carbonyl, and amide groups.

All cited patents, patent applications, and other references are incorporated herein by reference in their entirety.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A thermoplastic composition comprising, based on the total weight of the thermoplastic composition,
    from 0.1 to 30 weight percent of an inorganic filler composition comprising
        an inorganic filler-polyorganosiloxane composite formed by treating an inorganic filler with a liquid, reactive polyorganosiloxane having a terminal silanol group and a molecular weight of 100 to 5,000, in an amount from 0.1 to 25 weight percent of the polyorganosiloxane, based on the total weight of the filler and the polyorganosiloxane, and
an optional inorganic filler;
up to 80 weight percent of a polycarbonate; and
from 1 to 25 weight percent of an impact modifier.

2. The thermoplastic composition of claim 1, wherein the inorganic filler prior to treatment contains reactive surface hydroxyl groups.

3. The thermoplastic composition of claim 1, wherein the inorganic filler comprises talc, mica, clay, or a combination comprising at least one of the foregoing inorganic fillers.

4. The thermoplastic composition of claim 3, wherein the inorganic filler is talc.

5. The thermoplastic composition of claim 1, wherein the reactive polyorganosiloxane has the formula

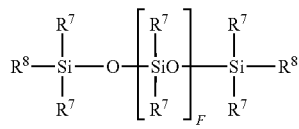

wherein F has an average value of 5 to 50; each $R^7$ is independently a $C_{1-13}$ monovalent organic group or a $C_{1-13}$ divalent organic group comprising a group reactive with the inorganic filler, and each $R^8$ is independently a $C_{1-13}$ monovalent organic group, a $C_{1-13}$ divalent organic group comprising a group reactive with the inorganic filler, or a group reactive with the inorganic filler, provided that at least one $R^8$ is a hydroxyl group.

6. The thermoplastic composition of claim 5, wherein
each $R^7$ is independently a $C_1$-$C_{13}$ alkyl, $C_1$-$C_{13}$ alkoxy, $C_2$-$C_{13}$ alkenyl, $C_2$-$C_{13}$ alkenyloxy, $C_3$-$C_6$ cycloalkyl, $C_3$-$C_6$ cycloalkoxy, $C_6$-$C_{10}$ aryl, $C_6$-$C_{10}$ aryloxy, $C_7$-$C_{13}$ aralkyl, $C_7$-$C_{13}$ aralkoxy, $C_7$-$C_{13}$ alkaryl, or $C_7$-$C_{13}$ alkaryloxy group, and
each $R^8$ is independently a primary amino group, secondary amino group, carboxylic acid group, sulfhydryl group, hydroxy group, or a $C_1$-$C_{13}$ alkylene, $C_2$-$C_{13}$ alkenylene, $C_6$-$C_{10}$ arylene, $C_7$-$C_{13}$ arylalkylene, or a $C_7$-$C_{13}$ alkylarylene comprising a primary amino group, secondary amino group, carboxylic acid group, sulfhydryl group, or a hydroxy groups, provided that at least one $R^8$ is a hydroxyl group.

7. The thermoplastic composition of claim 1, wherein the reactive polyorganosiloxane is a silanol-terminated poly(trifluoropropylmethylsiloxane), a silanol-terminated poly(dimethylsiloxane), a silanol-terminated poly(diphenylsiloxane-dimethylsiloxane) copolymer, or a combination comprising at least one of the foregoing siloxanes.

8. The thermoplastic composition of claim 1, further comprising an acid present in a weight ratio of acid to total filler of 0.01:1 to 0.1:1.

9. The thermoplastic composition of claim 1, wherein the composition retains 90% or more of its initial weight average molecular weight after extrusion and molding.

10. The thermoplastic composition of claim 1, wherein a 3.2 mm thick bar comprising the composition has a Notched Izod impact of greater than or equal to 50 kJ/m², measured at 23° C. in accordance with ISO 180:2000.

11. The thermoplastic composition of claim 1, wherein a 3.2 mm thick bar comprising the composition has a Notched Izod impact of greater than or equal to 15 kJ/m², measured at −30° C. in accordance with ISO 180:2000.

12. The thermoplastic composition of claim 1, wherein a sample comprising the composition has a Young's modulus of greater than 3.5 GPa.

13. The thermoplastic composition of claim 1, having an MVR measured at 260° C., 5 kg, of greater than 8.0.

14. The thermoplastic composition of claim 1, having a melt viscosity at 300° C./5000 sec$^{-1}$ of less than 70 Pascal-seconds, measured in accordance with ISO 11443.

15. The thermoplastic composition of claim 1, wherein a sample comprising the composition has 100% ductility in a multi-axial impact, measured at −30° C., in accordance with ISO 6603-2:2000.

16. A thermoplastic composition comprising, based on the total weight of the thermoplastic composition,
from 1 to 25 weight percent of an inorganic filler composition comprising
a talc-polyorganosiloxane composite derived by the treatment of talc with a liquid polyorganosiloxane of the formula

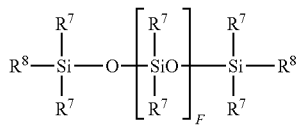

wherein F has an average value from 5 to 50, each $R^7$ is methyl, a mixture of methyl and trifluoropropyl, or a mixture of methyl and phenyl, and each $R^8$ is a hydroxyl group, and
an optional inorganic filler;
from 50 to 80 weight percent of a polycarbonate comprising units derived from bisphenol A;
from 1 to 15 weight percent of a methacrylate-butadiene-styrene impact modifier; and
from 1 to 15 weight percent of a styrene-acrylonitrile rigid copolymer.

17. The thermoplastic composition of claim 16, wherein the inorganic acid is present in a weight ratio of acid to total filler of 0.001:1 to 0.1:1.

18. An article comprising the composition of claim 1.

19. The thermoplastic composition of claim 16, wherein the inorganic filler-polyorganosiloxane composite is formed by treating an inorganic filler with the liquid polyorganosiloxane having a molecular weight of 100 to 5,000, in an amount from 0.1 to 25 weight percent of the polyorganosiloxane, based on the total weight of the filler and the polyorganosiloxane.

20. The thermoplastic composition of claim 16, wherein the composition retains 90% or more of its initial weight average molecular weight after extrusion and molding.

21. The thermoplastic composition of claim 16, wherein a 3.2 mm thick bar comprising the composition has a Notched Izod impact of greater than or equal to 50 kJ/m², measured at 23° C. in accordance with ISO 180:2000.

22. The thermoplastic composition of claim 16, wherein a 3.2 mm thick bar comprising the composition has a Notched Izod impact of greater than or equal to 15 kJ/m², measured at −30° C. in accordance with ISO 180:2000.

23. The thermoplastic composition of claim 16, wherein a sample comprising the composition has a Young's modulus of greater than 3.5 GPa.

24. The thermoplastic composition of claim 16, having an MVR measured at 260° C., 5 kg, of greater than 8.0.

25. The thermoplastic composition of claim 16, having a melt viscosity at 300° C./5000 sec$^{-1}$ of less than 70 Pascal-seconds, measured in accordance with ISO 11443.

26. The thermoplastic composition of claim 16, wherein a sample comprising the composition has 100% ductility in a multi-axial impact, measured at −30° C., in accordance with ISO 6603-2:2000.

27. An article comprising the composition of claim 16.

* * * * *